UNITED STATES PATENT OFFICE.

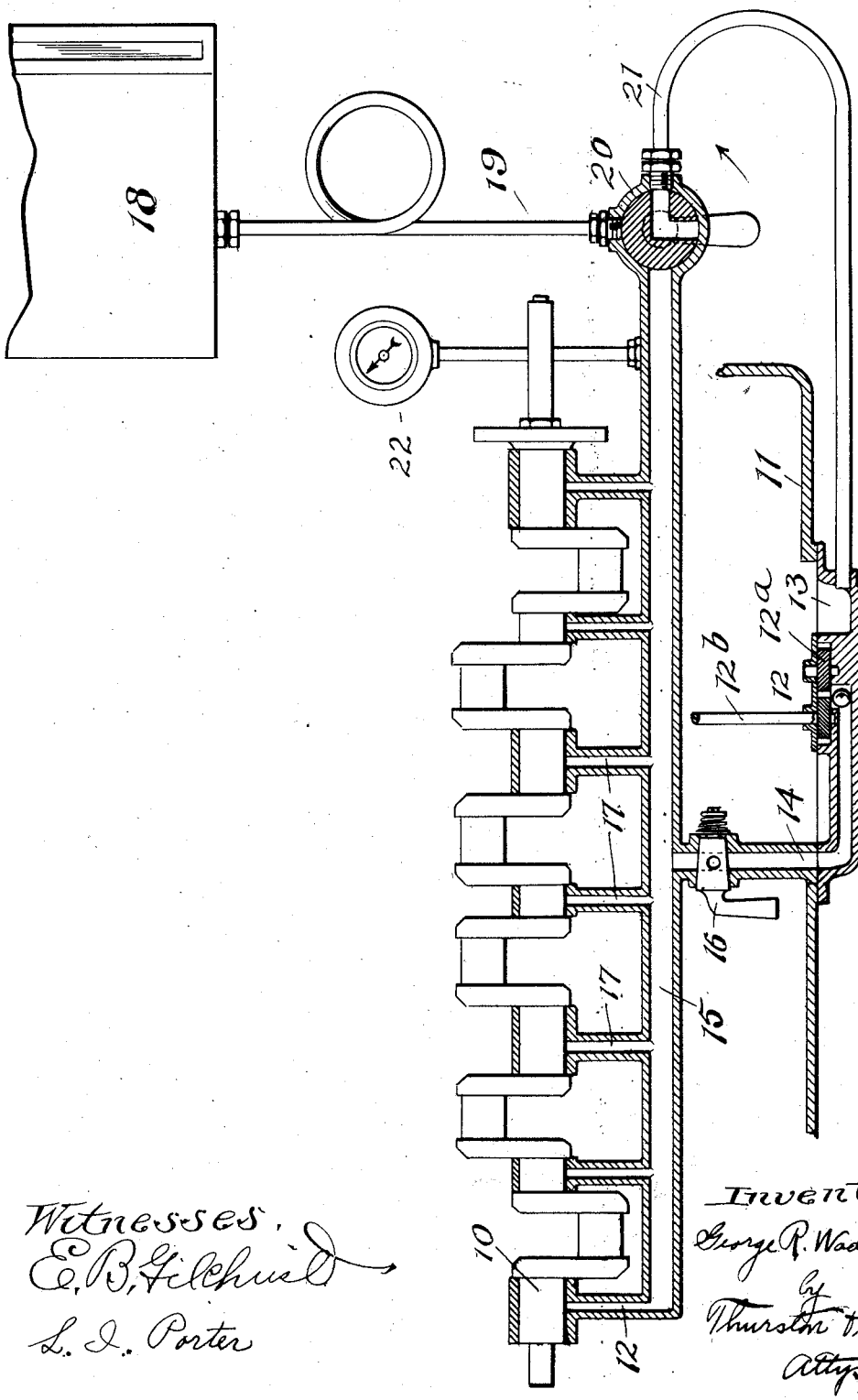

GEORGE R. WADSWORTH, OF CLEVELAND, OHIO, ASSIGNOR TO THE PEERLESS MOTOR CAR COMPANY, OF CLEVELAND, OHIO, A CORPORATION OF OHIO.

LUBRICATING SYSTEM.

1,214,850.  Specification of Letters Patent.  Patented Feb. 6, 1917.

Application filed May 31, 1913. Serial No. 770,852.

*To all whom it may concern:*

Be it known that I, GEORGE R. WADSWORTH, a citizen of the United States, residing at Cleveland, in the county of Cuyahoga and State of Ohio, have invented a certain new and useful Improvement in Lubricating Systems, of which the following is a full, clear, and exact description.

This invention relates to lubricating systems adapted particularly for use in connection with internal combustion engines. The object of the invention is to provide in a lubricating system of the forced feed type employing a pump which normally forces oil to the bearings, a supplemental source of supply so arranged with respect to and connected to the passageways leading to the bearings that oil may be fed to the bearings by gravity, so that the bearings may be lubricated with gravity feed, in case the pump gets out of order, or does not work satisfactorily.

In carrying out my invention, the pump which is normally employed to force oil to the bearings and which may be located in the bottom of the crank case of the engine, is connected to a manifold from which the oil flows to the various bearings which are adapted to be supplied with oil, and in connection with this system, I provide a tank which may have a pipe connection with the manifold so as to supply oil thereto in case the pump is out of order. A suitable valve may be provided between the manifold and the tank so as to control the passage of oil from the tank to the manifold, and a valve may be provided between the manifold and the pump, so that communication between the pump and manifold can be closed when the oil is to be fed by gravity from the auxiliary source of supply.

In the drawings, the single figure shows in a simplified form a portion of the internal combustion engine equipped with my improved lubricating system.

I have omitted from the drawing, the major portion of the engine, and have shown only such parts as are required to be shown for a clear understanding of the invention. The parts of the engine which are shown, include a crank shaft 10 and a bottom portion of the crank case 11. The oil is normally forced to the crank shaft bearings which are to be lubricated by a pump 12 which in this case includes two intermeshing oil feeding gears 12$^a$, one of which is adapted to be positively driven by shaft 12$^b$ which may be connected to the engine in any suitable manner. This pump is preferably located in a pit or reservoir 13 in the bottom of the crank case 11. The outlet side of the pump is connected by a suitable passageway 14 to a manifold 15 to which the oil is adapted to be forced or fed by the pump 12. This passageway between the manifold and pump may be closed by a suitable valve 16, which, however, is normally open. The manifold which is below the crank shaft 10 is connected to the bearings of the latter by suitable passageways 17 through which oil may be forced by the pump.

Ordinarily the parts so far described will be sufficient to oil all the bearings which need be supplied with oil, the oil being forced up to the bearings and then permitted to drain back into the pit or reservoir of the crank case in the usual and well known manner. In carrying out my invention, I utilize, in connection with the forced feed oiling system above described, an auxiliary source of oil supply 18 which is to be utilized in case the pump is out of order or is not working satisfactorily to supply a sufficient amount of oil to the bearings. The capacity of this tank will be such that it normally contains a sufficient amount of oil to lubricate the bearings for a run of a few miles, or for a sufficient length of time to enable the operator to reach a point at which the pump can be repaired, so that oil can be fed or supplied in the normal manner, and by the normal means.

The tank 18 is provided with an outlet pipe 19 which is normally closed by a three-way valve 20, the chamber of which is connected to the manifold 15 and to a pipe 21 leading to the reservoir 13. When the valve is in the position shown in the drawing, oil does not flow from the tank either into the manifold or into the pipe 21. In case the valve is moved 90° from the position shown, the pipe 19 is connected to the pipe 21, and oil flows into the reservoir. In case the valve is moved 180° from the position shown, oil flows from the tank into the manifold, the tank is sufficiently elevated with respect to the manifold and bearings to be oiled that when the tank is connected to the manifold, oil will not only flow by gravity from the for..r into the manifold, but will be forced up to the bearings. Thus, the bearings can be lubricated by oil forced upwardly by the pump, or by oil flowing by gravity from the tank, and in case the pump is rendered ineffective, there is no immediate danger of the bearings being damaged. A suitable pressure gage 22 connected to the manifold will enable the operator to determine whether or not the pump is working satisfactorily.

Having thus described my invention, what I claim is:

In a lubricating system, a manifold adapted for connection with bearings to be lubricated, a pump having its discharge side connected to the manifold, a storage receptacle supported above the manifold, a connection between the receptacle, the manifold and inlet side of the pump and valvular means controlling the connection between the receptacle, and the manifold or the pump.

In testimony whereof, I hereunto affix my signature in the presence of two witnesses.

GEORGE R. WADSWORTH.

Witnesses:
    L. I. PORTER,
    A. F. KWIS.